2 Sheets—Sheet 1.

J. WOOD,

Assignor of one-half to A. S. VOGT.

Automatic Railroad Train Arrester.

No. 9,614. Reissued March 22, 1881.

WITNESSES:
R. E. Janney
V. L. West

INVENTOR:
JOSEPH WOOD,
BY H. W. Beadle & Co.
ATTYS.

2 Sheets—Sheet 2.

J. WOOD,

Assignor of one-half to A. S. VOGT.

Automatic Railroad Train Arrester.

No. 9,614. Reissued March 22, 1881.

WITNESSES:

R. E. Janney

U. L. West

INVENTOR:

JOSEPH WOOD,

BY H. W. Beadle & Co.

ATTYS.

UNITED STATES PATENT OFFICE.

JOSEPH WOOD, OF ALTOONA, PENNSYLVANIA, ASSIGNOR OF ONE-HALF TO AXEL S. VOGT, OF SAME PLACE.

AUTOMATIC RAILROAD-TRAIN ARRESTER.

SPECIFICATION forming part of Reissued Letters Patent No. 9,614, dated March 22, 1881.

Original No. 230,097, dated July 13, 1880. Application for reissue filed February 23, 1881.

*To all whom it may concern:*

Be it known that I, JOSEPH WOOD, a citizen of the United States, residing at Altoona, in the county of Blair and State of Pennsylvania, have invented certain new and useful Improvements in Automatic Railroad-Train Arresters; and I do hereby declare the following to be a full, clear, and exact description of the invention, reference being had to the accompanying drawings, and to the letters of reference marked thereon, which form a part of this specification.

This invention belongs to that class of inventions which has for its distinguishing characteristic a capacity to arrest automatically the movement of a railroad-train by the actuation of proper mechanism located on the train by proper mechanism located off from the train, upon the side of the track; and it consists, broadly, in the combination of the following elements: first, a closed brake-pipe on the train extending outward beyond the normal boundary-line; second, a device upon the pipe end, substantially as described, adapted by contact with an immovable device to open the pipe; and, third, an arm properly held at the side of the track in that plane in which the device on the pipe end moves, the construction and arrangement being such that by the movement of the train the device on the pipe end is brought against the arm at the proper time, and by contact with the same is caused to open the pipe.

It consists, further, in the employment, in connection with the closed brake-pipe on the train and the contact-arm by the side of the track, of a specific device upon the pipe—that is, a frangible tube—as will be fully described hereinafter.

Figure 1:
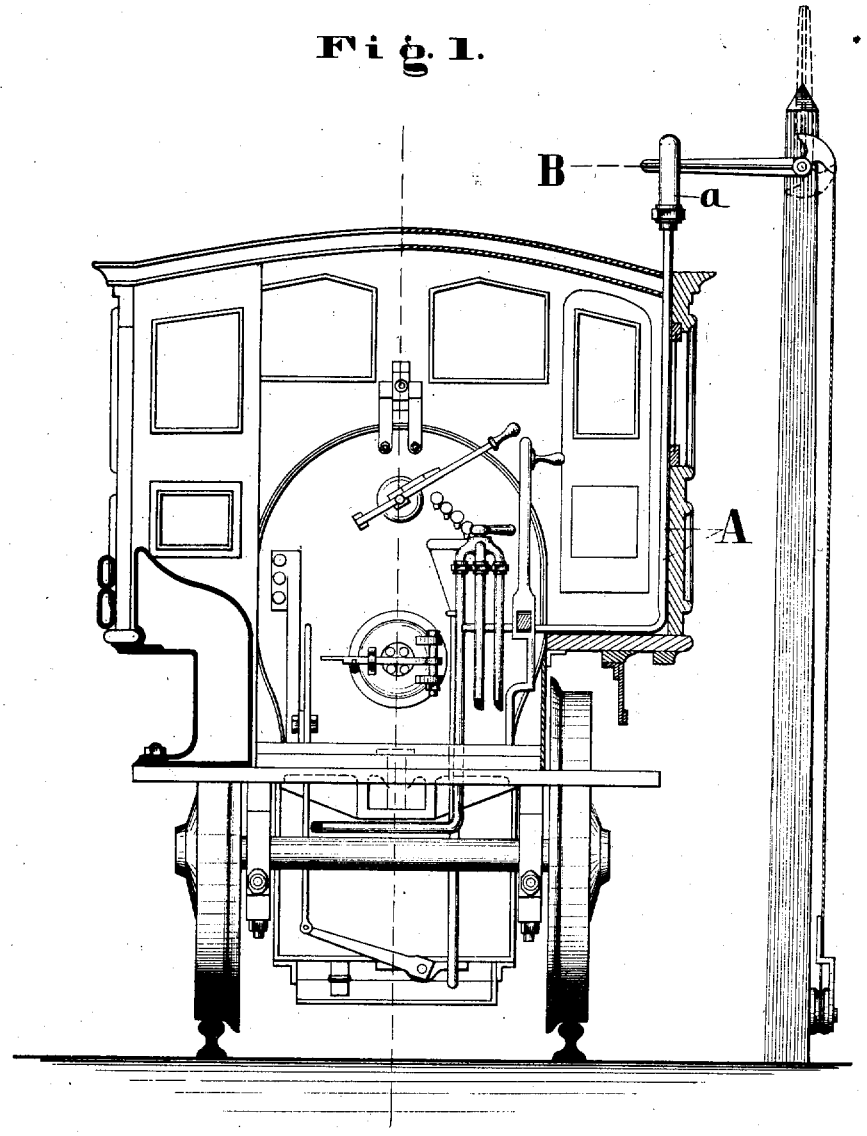
Figure 2:
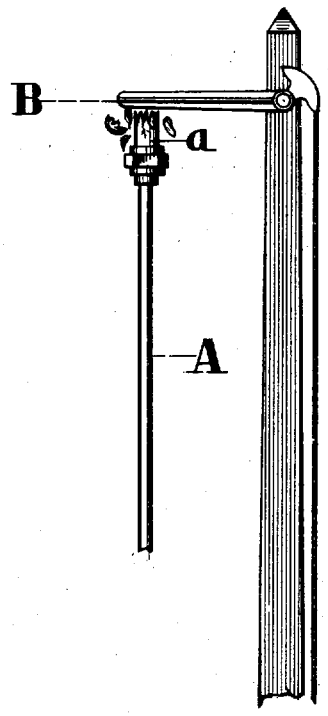

In the drawings, Figure 1 represents a rear-end elevation of a locomotive and caboose, with the latter partially in section, and Fig. 2 a view of the elements composing the invention detached from the remaining parts.

To enable others skilled in the art to make and use my improvement in automatic train-arresters, I will proceed to describe fully the construction of the same and the manner of its operation.

A, Figs. 1 and 2, represents a branch pipe, connected at any proper point with the brake or train pipe of an air-brake system, which branch extends outward in any proper direction beyond what may be termed, for convenience, the "normal boundary-line."

*a* represents a frangible tube of any suitable size or shape, preferably of glass, which is united to the end of the branch pipe, as shown, in any suitable manner. The outer end of the tube is closed.

B represents an arm properly supported upon the side of the track, which, at proper times, may be caused to extend into that plane, horizontal and vertical, in which moves the tube *a*. This arm, when in its contact position, is immovable as far as the device on the pipe end is concerned.

The operation is substantially as follows: The arm B upon the side of the track being held in that plane in which is held the tube *a* upon the train, and motion being given to the latter, it follows that at the proper time the tube will come in contact with the arm, and that consequently, the latter being broken, the branch pipe will be instantly opened. The branch pipe being opened, the brake will be applied, of course, to arrest the movement of the train, in the manner well understood.

I do not limit myself to the application of this invention to an air-brake system, as it is, of course, applicable to any system of fluid-pressure brakes in which the brake may be applied by opening a closed pipe. Neither do I limit myself to the employment of a frangible tube at the pipe end. The distinguishing characteristic of my invention being the opening of a closed brake-pipe by the contact of a device located upon the train with an arm upon the side of the track, it follows that the specific device employed for opening the pipe is not necessarily a fundamental feature of the invention. In place of the frangible tube, its equivalent—a cock or valve—adapted to be operated by contact with the arm in such manner as to open the closed pipe, may be employed.

In practice a semaphore is employed to support the arm B, and the latter may be moved into or out of the contact position when desired, by any suitable means, in the manner well understood. These semaphores are arranged at any points when it may be desired for any reason to arrest the movement of the train.

Having fully described my invention, what I claim as new, and desire to secure by Letters Patent, is—

1. In an automatic train-arrester, the combination of the following elements: first, a closed brake-pipe on the train extending outward beyond the normal boundary-line; second, a device upon the pipe end, substantially as described, adapted by contact with an immovable arm to open the pipe; and, third, an arm properly held at the side of the track in that plane in which the device on the pipe end moves, the construction and arrangement being such that by the movement of the train the device on the pipe end is brought against the arms at the proper time, and by contact with the same is caused to open the pipe, all substantially as described.

2. In an automatic train-arrester having a brake-pipe, substantially as described, a frangible tube closing the end of the pipe, arranged in such relation to an arm upon the side of the track as to be broken at the proper time by contact with the same.

This specification signed and witnessed this 14th day of February, 1881.

JOSEPH WOOD.

Witnesses:

AXEL SAMUEL VOGT,
W. D. COUCH.